(12) United States Patent
Seino et al.

(10) Patent No.: US 8,338,792 B2
(45) Date of Patent: Dec. 25, 2012

(54) RADIATION MEASURING CIRCUIT, NUCLEAR MEDICINE DIAGNOSING APPARATUS, AND METHOD OF MEASURING RADIATION

(75) Inventors: Tomoyuki Seino, Hitachi (JP); Yuichiro Ueno, Hitachi (JP); Takafumi Ishitsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 482 days.

(21) Appl. No.: 12/708,933

(22) Filed: Feb. 19, 2010

(65) Prior Publication Data
US 2011/0204248 A1 Aug. 25, 2011

(51) Int. Cl.
*G01T 1/24* (2006.01)
(52) U.S. Cl. .................................................. 250/370.01

(58) Field of Classification Search ............. 250/370.01, 250/370.08, 370.09, 370.12, 370.13, 371
See application file for complete search history.

(56) References Cited

U.S. PATENT DOCUMENTS

| 6,472,668 | B1 * | 10/2002 | Griesmer et al. | ........ 250/370.13 |
| 7,514,689 | B2 | 4/2009 | Seino et al. | |
| 2009/0242780 | A1 | 10/2009 | Seino et al. | |

FOREIGN PATENT DOCUMENTS
JP 3938189 B2 4/2007

* cited by examiner

*Primary Examiner* — Mark R Gaworecki
(74) *Attorney, Agent, or Firm* — Mattingly & Malur, PC

(57) ABSTRACT

Provided between a bias power supply and a radiation detector are a noise filter and a bias voltage transmitting circuit. In a state where the bias voltage is applied, the noise filter circuit operates. In a state where the bias voltage is switched on and off, the bias voltage transmitting circuit and the noise filter circuit operate. In a state where the bias voltage is switched on and off, the bias voltage transmitting circuit operates.

15 Claims, 9 Drawing Sheets

GAMMA RAY ENERGY [keV]
JUST AFTER MEASUREMENT START

GAMMA RAY ENERGY [keV]
1H AFTER MEASUREMENT START

JUST AFTER MEASUREMENT START

1H AFTER MEASUREMENT START

RADIATION MEASURING CIRCUIT, NUCLEAR MEDICINE DIAGNOSING APPARATUS, AND METHOD OF MEASURING RADIATION

BACKGROUND OF THE INVENTION

The present invention relates to a radiation measuring apparatus, a nuclear medicine diagnosing apparatus using the same, and a method of measuring radiation.

RELATED ART

A semiconductor detector has a problem called "polarization" in using the same. The problem is caused by a phenomenon showing decrease in an energy resolution when a bias voltage is continuously applied to measure a radiation ray and variation with time such as a shift of energy of a detected X ray or a detected gamma ray to a low energy side when this indication further proceeds. This is caused by that carriers are accumulated as space charges because the carriers are trapped by crystal defects.

Because the "polarization" is not a permanent phenomenon, making the bias voltage zero restores the detection characteristic. However, for a period while the bias voltage is zero or varies, the radiation detection is not done (referred to as dead time). This may cause a problem in which continuous measurement is not retained. Japanese Patent 3938189 discloses a method of shortening a period for which the bias voltage is made zero.

This method provides a sufficient effect on suppressing the "polarization" under a condition in which the period for which the bias voltage is made zero is approximately from 0.5 to 1 sec and an interval between the periods is about three minutes. When the bias voltage is switched on and off in an interval of an order of a millisecond, there is a problem of a surge current flowing. At worst, the surge current may enter an amplifying circuit, so that the amplifying circuit may be damaged.

However, this may be prevented by providing a protection circuit using a generally known diode or the like on an input side of the amplifying circuit. It is possible to protect the amplifying circuit by carefully selecting a circuit element such as a diode used in the protection circuit regarding an electrostatic capacity or the like without degradation in performance such as the energy resolution.

To switch on and off the bias voltage rapidly, it is necessary to degrade a performance of the noise suppressing circuit provided to prevent noise coming from the bias voltage source from transmitting to the radiation detector. Noise superimposed on the bias voltage enters via the detector a signal processing circuit, which may cause degradation of the performance such as the energy resolution. Thus, to prevent the noise from entering a detector side, a noise filter circuit is provided between the bias voltage source and the detector.

However, to transmit switch on and off of the bias voltage without time delay, it is necessary to increase an upper frequency limit of a passband of the noise filter circuit. This will result in allowing the noise to easily transmit therethrough. Accordingly, conventionally, it was necessary to severely do a noise countermeasure on the side of the bias voltage source. Nevertheless this countermeasure does not serve as an effective removing means for removing the noise once entering the circuit between the bias voltage source and the detector.

The problem to be solved is to transmit variation in switching on and off of the bias voltage through the noise filter without the time delay without degradation of a performance of the noise filter between the bias voltage source and the detector.

SUMMARY OF THE INVENTION

An aspect of the present invention provides, between the bias voltage source and the radiation detector, the noise filter circuit as well as a bias voltage transmitting circuit. The noise filter circuit operates in a state in which the bias voltage is applied. The bias voltage transmitting circuit operates in a state in which the bias voltage is switched on and off.

According to an aspect of the present invention, when the bias voltage is applied to do a radiation measurement, the noise filter circuit operates, so that the measurement can be done in a low noise state. As a result, a measurement result can be obtained with a good energy resolution.

On the other hand, switching on and off of the bias voltage can be done when the bias voltage is once switched off and on again to suppress "polarization" because the bias voltage transmitting circuit operates. In other words, continuity between a superior energy resolution and a superior measurement can be obtained without degradation of the noise removing performance.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
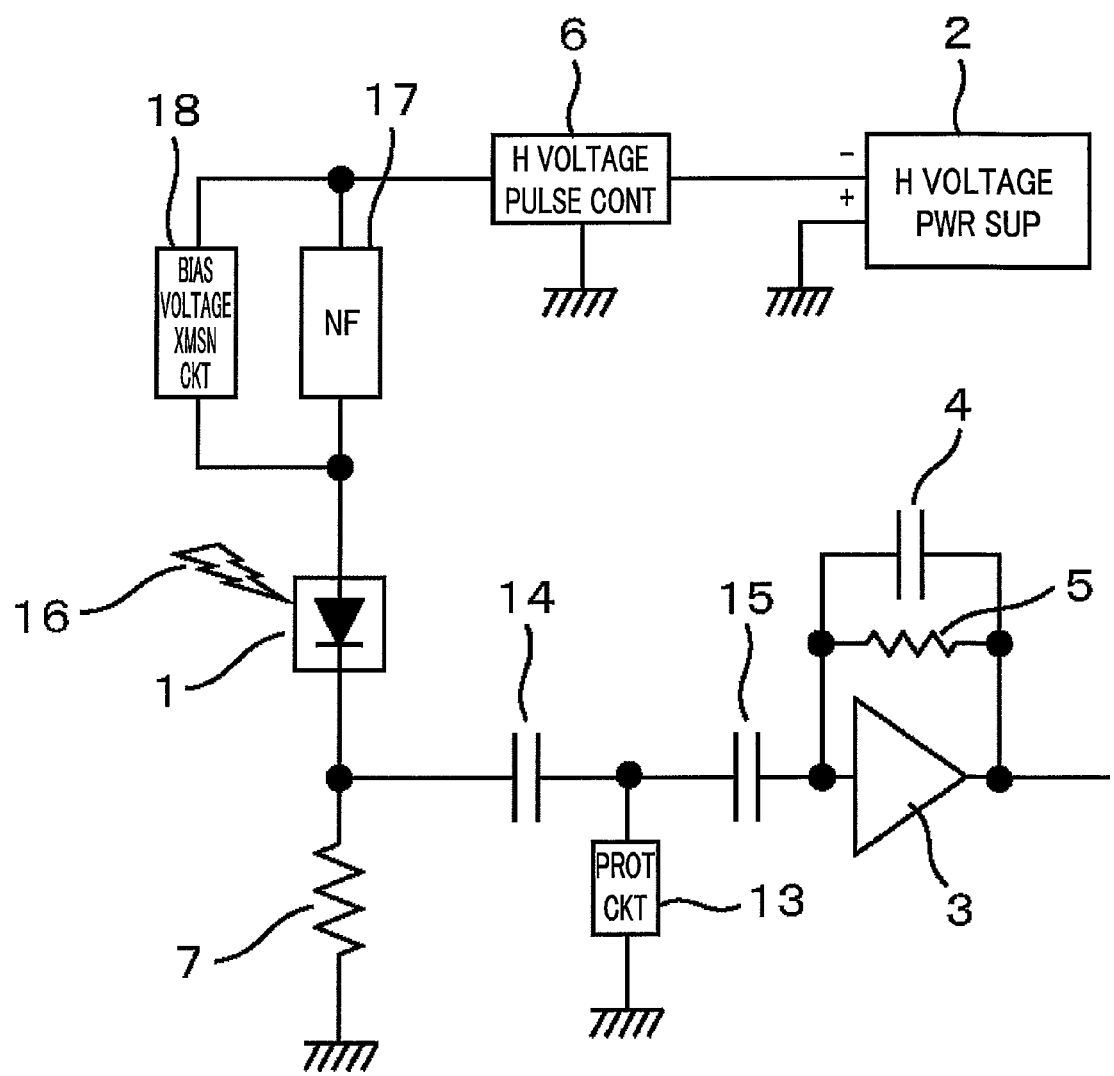
FIG. 1 is a schematic diagram of a circuit of a radiation measuring apparatus according to the present invention.

Hereinbelow will be described radiation measuring circuits and nuclear medicine diagnosing apparatuses using the same of embodiments.

As a detector in the radiation measuring apparatus, there are an ion chamber, a scintillation detector, a semiconductor detector, an integrating dosimeter, and the like which are used in accordance with use. When it is desired to obtain not only doses of a gamma ray and an X-ray but also energy information thereof, the semiconductor detector is generally used. This is because the gamma ray or the X-ray incident to the semiconductor is subject to energy conversion in the semiconductor, which generates a great quantity of carrier charges such as electrons and holes, and a quantity of the charge is proportional to energy of the gamma ray and the X-ray. In other words, measuring the quantity of charges provides information of energy, so that a measurement result can be obtained with a high accuracy. Although the scintillation detector can also obtain information of energy by measuring a quantity of light with a photo-multiplier or a photodiode after the gamma ray or the X-ray is converted into the light, it is difficult to obtain information of energy with a high accuracy because once the gamma ray or the X-ray is converted into the light. Accordingly, the semiconductor detector is generally used.

As a material used as the semiconductor detector, silicon, germanium, cadmium telluride, cadmium zinc telluride, or the like is known. Silicon is a most well known material which is generally used in an IC (integrated circuit). However, silicon, having an atomic number of 14 and a low density, has a low possibility in that the gamma ray and the X-ray respond within a crystal of silicon. Accordingly, silicon is mainly used in applications permitting low energy in magnitude of the X-ray such as an elemental analyzer. Germanium, having an atomic number of 32 which is slightly great and has a great mobility of carriers, is a detector extremely superior in an energy identification power (energy resolution power).

However, germanium, showing a great leak current because germanium has a small band gap of about 0.7 eV, requires cooling to a low temperature in use. Cadmium telluride, and cadmium zinc telluride, having band gaps of approximately from about 1.4 eV to 1.6 eV and thus having low leak currents even at room temperatures, are usable as the radiation detector. Further, an average atomic number is about 50 which is rather great and has a high sensitivity to the gamma ray and the X-ray. Cadmium zinc telluride has difficulty in being produced with a high yield because three types of elements are used. On the other hand, cadmium telluride, being formed with two types of elements and thus having a relatively high yield, is a material which has been able to be mass-produced.

Cadmium telluride can be used even at room temperatures as mentioned above and is used as the radiation detector with a high sensitivity to the X-ray and the gamma ray. The material is generally used in a form of diode to which a reverse bias voltage is applied. However, the semiconductor radiation detector using the cadmium telluride or the like has a problem in use called "polarization".

The problem is in variation in time such as decrease in an energy resolution when a bias voltage is continuously applied to measure a radiation ray in the radiation detector, particularly the radiation detector in which cadmium telluride is formed in a diode and a shift of energy of a detected X ray or a detected gamma ray to a low energy side when this phenomenon further proceeds. This is caused by that carriers are accumulated as space charges because the carriers are trapped by crystal defects.

This is the phenomenon well known in handing the radiation detector using cadmium telluride and is a problem. Further, this phenomenon is not remarkable at temperature under the room temperature. However, this phenomenon proceeds in an order of from several to tens minutes. The detector, generally used at a location near electronic circuits such as an amplifier for signals, has a temperature approximately higher than the room temperature if is not cooled. Reversely, if the temperature is not stable and higher than the room temperature, it is difficult to be used. Cooling cadmium telluride can avoid the problem of "polarization". However, other problems occur such as a complexities accompanying anti condensation or the cooling mechanism, and an advantageous effect on germanium becomes worthless if cadmium telluride is used with cooling.

Because the "polarization" is not a permanent phenomenon, making the bias voltage zero can restore the detection characteristic. Accordingly, to avoid the "polarization" by other method than cooling there is a method of making the bias voltage temporarily zero. More specifically there is a circuit for varying the bias voltage for several seconds. However, for a period while the bias voltage is zero or varies, the radiation detection is not done (referred to as dead time). This may cause a problem in which continuity in measurement is not retained. If the period is longer than several seconds, the continuity of measurement cannot be retained. In other words, inconvenience occurs in that applications in which the semiconductor detectors are usable are limited.

To improve a measuring condition, there is a method in which the period for which the bias voltage is made zero is shortened. In this method, the period for which the bias voltage is made zero is approximately from 0.5 to 1 second and an interval of the periods is about five minutes, which provides a sufficient effect on suppressing the "polarization". However, the period for which the bias voltage is varied or made zero is about one second, which is not short. Then the inventors studied how short the period can be made without affection on avoiding the "polarization". As a result, the inventors found that the period for which the bias voltage made zero is allowed to be about several milliseconds only if the interval of the periods is made around several tens seconds. Because the dead time of about several milliseconds is sufficiently short, the continuity can be kept without problems. This is a sufficiently short interval for an apparatus using the radiation detector such as a gamma camera, a single photon emission computed tomography (SPECT), positron-emission computerized tomography (PET), and an environmental radiation monitoring apparatus.

When the bias voltage is switched on and off with an interval of a millisecond order, there is a problem of a surge current flowing. At worst, the surge current enters an amplifying circuit, which may destroy the amplifying circuit. However, this problem can be avoided by providing a protection circuit using a generally known diode on an input side of the amplifying circuit. It is possible to protect the amplifying circuit by carefully selecting a circuit element regarding an electrostatic capacitance of the diode used in the protection circuit without degradation of the energy resolution or the like.

To rapidly switch on and off the bias voltage, it is necessary to degrade a performance of a noise filter circuit for preventing noise coming from the bias voltage source from transmitting to the radiation detector. The noise superimposed on the bias voltage may enter a signal processing circuit via the detector, which may cause degradation in the performance of the energy resolution or the like.

To prevent the noise from entering a side of the detector the noise filter circuit is used between the bias voltage source and the detector. However, to transmit rapid switch on and off of the bias voltage without time delay it is necessary to provide an upper limit frequency for a passband of the noise filter circuit. This may cause the noise to easily pass through the noise filter. Thus conventionally, it was necessary to install a severe antinoise circuitry on the side of the bias power source. However, such an antinoise circuitry is not an effective removing means against noise entering a circuit between the bias voltage source and the detector. The problem to be solved is to pass variation in switch on and off of the bias voltage without time delay in which performance of the noise filter between the bias voltage and the detector is not degraded.

This problem is solved by that between the bias voltage source and the radiation detector, the noise filter circuit is provided as well as a bias voltage transmitting circuit is provided. In a state in which the bias voltage is applied, the noise filter circuit operates and in a state in which the bias voltage is switched on and off, the bias voltage transmitting circuit operates. More specifically, a noise filter circuit in which a resistive element and a capacitor connected in parallel on a side of the radiation detector is provided between the bias voltage source and the radiation detector and the bias transmitting circuit comprising a diode clamp circuit and a Zener diode is connected in parallel to the resistive element.

According to the embodiment, the measurement can be done in low noise state because the noise filter circuit operates when the bias voltage is applied for the radiation measurement. As a result, a measurement result can be obtained with a good energy resolution.

On the other hand, in the case where the bias voltage is once switched off to suppress the "polarization" and then switched on again, the switch on and off can be rapidly done because the bias voltage transmitting circuit operates. More specially, this operation provides a preferable energy resolution and continuity for a good measurement because switch on and off of the bias voltage can be transmitted at a high speed without degradation of a noise removal performance. Further, switch on and off of the bias voltage can keep the performance of the radiation detector constant. In addition, the noise filter circuit and the bias voltage transmitting circuit, being not switched therebetween in response to an external signal, a complicated operation is not necessary, so that reliability is high.

The above-mentioned advantageous effect provides the radiation measuring circuit and is preferable to obtain a superior nuclear medicine diagnosing apparatus. More specifically, because noise is low and the energy resolution is preferable, a superior image quality can be obtained, and because the bias voltage can be switched at a high speed, there is almost no interruption of images. The operation has a high reliability because a switching operation between the noise filter circuit and the bias voltage transmitting circuit is unnecessary. The high reliability is extremely important advantageous effect in the nuclear medicine diagnosing apparatus accompanied by a process of injecting radiopharmaceutical into a human body.

Hereinbelow with reference to drawing will be described examples. Elements with the same reference numerals in different drawings are designated with the same reference numerals and thus a duplicated description will be omitted.

First Embodiment

Next will be described embodiments of the present invention with a radiation measuring apparatus being exemplified.

FIG. 1 shows a circuit of a radiation measuring apparatus according to the first embodiment from a radiation detector to a first stage of amplifier. The circuit of the radiation measuring apparatus shown in FIG. 1 includes a detector 1 including a semiconductor element for detecting a radiation ray 16, a high voltage power supply 2 for applying a high voltage to the detector 1, a noise filter circuit 17 for removing noise from a bias voltage applied by the high voltage power supply 2, and a bias voltage transmitting circuit 18 for transmitting an output of the bias voltage source to the radiation detector 1 when the bias voltage is switched off and on. The radiation detector 1 comprising a cadmium tellurium semiconductor is equivalent to a diode, and generally used with reverse bias. Because the output of the high voltage power supply 2 in FIG. 1 has a negative connection, the connection direction of the diode shown in FIG. 1 is correct.

First will be described an operation in the radiation measuring. A negative DC bias voltage is applied from the high voltage power supply 2 through a high voltage pulse controller 6, a resistor 9 and a capacitor 8 forming the noise filter circuit to the detector 1 which is a semiconductor radiation detector. This connection corresponds to a reverse biasing a diode and thus a depletion layer is formed in the detector, so that a DC leak current slightly flows through the detector 1 when there is no incident radial ray. When the gamma ray 16 is incident to the detector 1, generating charges therein, a pulse current signal having a quantity of charges according to energy per a photon of the gamma ray flows as a detection signal. The detection signal is a high frequency pulse current transmitted to the amplifying circuit 3 through capacitors 14 and 15. Between an input side terminal and output side terminal of the amplifying circuit 3, a capacitor 4 and a resistor 5 are connected in parallel. The detection signal is amplified to have a predetermined signal intensity by the amplifying circuit 3 and outputted toward a rear stage of amplifier or the like (not shown).

In addition, a resistor 7 is provided for releasing the DC leak current from the detector 1 and the charges of the detection signal accumulated in the capacitor 14 and a resistor generally having a resistance higher than tens MΩ. In addition, a protection circuit 13 is connected to between the capacitors 14 and 15. The protection circuit 13 is provided for protecting the amplifying circuit 3 from a surge voltage generated when the bias voltage is switched on and off in a short interval mentioned later.

Next, an operation in which the bias voltage is once switched off at a high speed and on again will be described. A CdTe semiconductor radiation detector is a detector operating at the room temperature. However, it is known that when the detector is continuously used, the energy resolution power and a sensibility, which are an index of performance, decreases for about several minutes to tens minutes due to a phenomenon called "polarization". Because this phenomenon can be suppressed by switching off the bias voltage for about tens msec at a rate of once several minutes, the bias voltage is switched on and off at a high speed.

Here, consider a case where the bias voltage of −500 V is switched from on to off and from on to off in one msec. The noise filter circuit 17 is provided for cutting off AC components or high frequency components superimposed on the DC bias voltage, and the cutoff frequency is generally selected from about 0.5 Hz to 100 Hz. However, the filter having such a cutoff frequency cannot accurately transmit such a high speed voltage variation that period is one msec.

On the other hand, in FIG. 1, a bias voltage transmitting circuit 18 is provided in parallel to the noise filter circuit 17. When the bias voltage variation occurs, the bias voltage variation can be accurately transmitted by using the bias voltage transmitting circuit 18.

In addition, if it is allowed to make the bias voltage retained to be applied to the detector 1 or to make the bias voltage retained to be off, it is sufficient to make the bias voltage transmitting circuit 18 retained not to be operated. In this case, noise is suppressed by the noise filter circuit 17.

Figure 2:
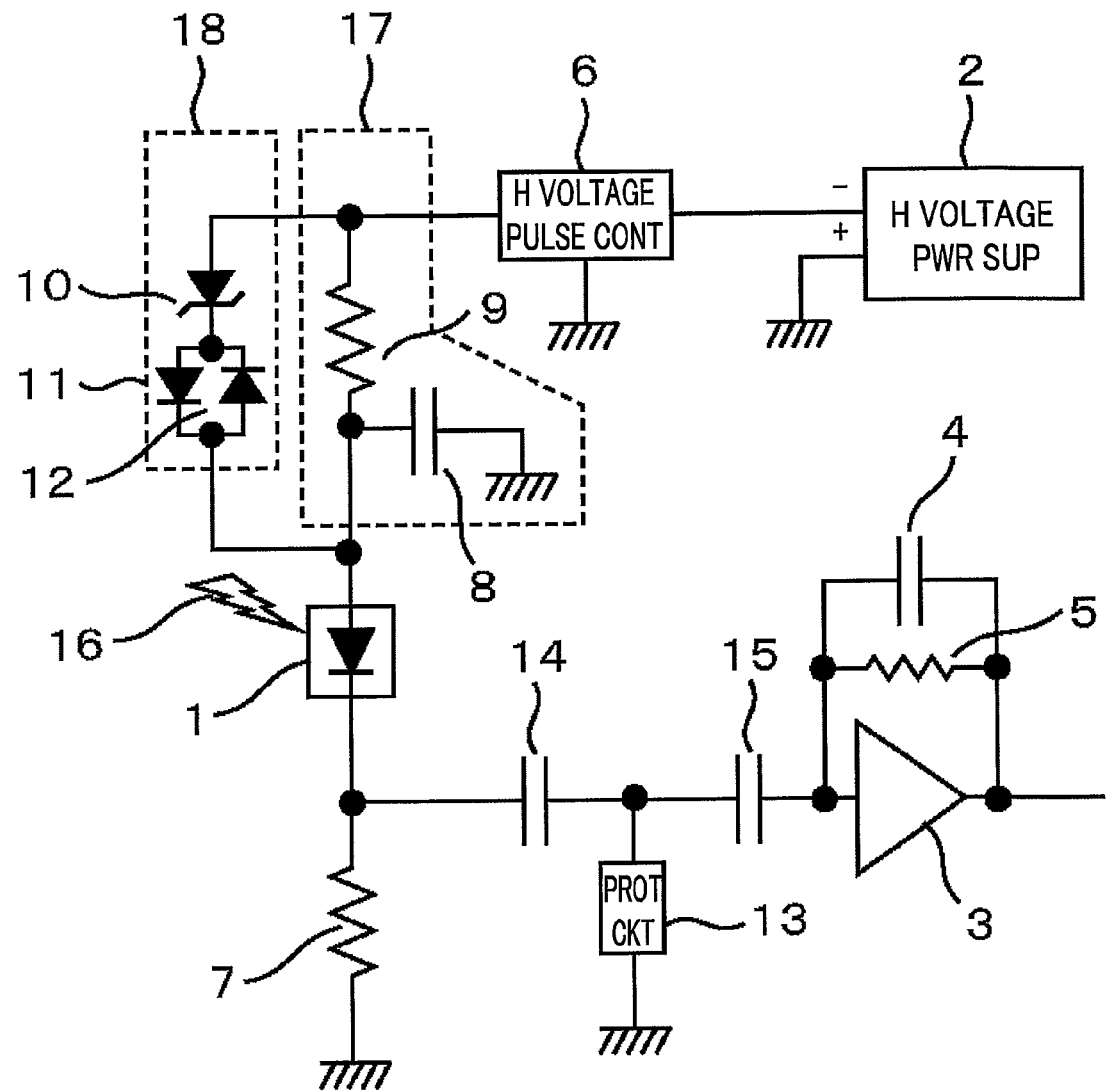
FIG. 2 is a schematic diagram of a circuit of a radiation measuring apparatus according to a first embodiment.

Hereinbelow will be described a case where concrete circuit elements are applied to the noise filter circuit 17 and the bias voltage transmitting circuit 18. In FIG. 2, if circuit elements of 10 MΩ and 10000 pF are used as the resistor 9 and the capacitor 8, respectively, which form the noise filter circuit 17, then the filter circuit 17 has a cutoff frequency of 1.6

Hz and an operating time constant of 100 msec, so that it is impossible to switch on and off the bias voltage within one msec for the detector 1.

To switch on and off the bias voltage within one msec, the operating time constant should be made about 0.2 msec. Thus, the resistor 9 should have a resistance of, for example, 20 kΩ or the capacitor 8 should have a capacitance of, for example, 20 pF. The noise filter circuit having such constants, having a cutoff frequency of about 800 Hz, cannot remove commercial voltage frequency components of 50 Hz and 60 Hz. However, using diodes 11 and 12 and a Zener diode 10 forming the bias voltage transmitting circuit 18 permits switch on and off of the bias voltage to the detector 1 in one msec by using a circuit element of 10 MΩ for the resistor 9 and a circuit element of 10000 pF for the capacitor 8.

Next will be described operation of these circuits.

Circuit elements having an operation voltage of 0.6 V were used for the diodes 11 and 12 and a circuit element having a reverse direction operation voltage of 2 V and a forward operation voltage of 0.6 V was used for the Zener diode 10. When the high voltage controller 6 varies the bias voltage from −500 V to 0 V in one msec, a voltage across the resistor 9 rapidly increases. However, when the voltage across the resistor 9 exceeds 1.2 V, the diode 11 and the Zener diode 10 operate to allow the charge in the capacitor to flow, so that the voltage applied to the detector 1 can be decreased to −1.2 V for about one msec. To accurately make the voltage 0 V, it is sufficient to make an off voltage of the high voltage power supply 2 +1.2 V. However, the off voltage of −1.2 V is sufficient to eliminate the "polarization".

Next, when the high voltage pulse controller 6 makes the bias voltage from 0 V to −500 V for one msec, the voltage across the resistor 9 rapidly increases similarly. However, when the voltage across the resistor 9 is equal to or greater than 2.6 V, the diode 12 and the Zener diode 10 operate to allow a current to flow to the capacitor 8, so that the voltage applied to the detector 1 reaches −497.4 V for about one msec. After that, because the voltage across the resistor 9 becomes equal to or smaller than 2.6 V, the diode 12 and the Zener diode 10 will not operate. In addition, the detector 1 can sufficiently operate from when the voltage reaches −497.4 V. In other words, the diodes 11 and 12, and the Zener diode 10 operate only when the bias voltage is switched on and off, and do not operate when the bias voltage is always on.

Next will be described in detail an operation in radiation measuring, i.e., in a state where the bias voltage is always on.

When the diode 12 and the Zener diode 10 operate while the bias voltage is on, i.e., when a current flow therethrough, these become noise generation sources, which is unfavorable. On the other hand, the voltage across the resistor does not become 0 V while the bias voltage is on. This is because the leak current flows through the detector 1. If a detector has a small leak current, the voltage across the resistor 9 is small, so that almost no current flows through the diode 12 even if the Zener diode 10 is eliminated. However, if a detector having a large leak current is used, there may be a case where the voltage across the resistor 9 increases and a current may flow through the diode 12.

The Zener diode 10 is provided for increasing the operation voltage of the diode 12 by a Zener voltage to prevent a current from flowing through the diode even if a detector having a great leak current is used. For example, in a case where the leak current is 10 nA, if the resistor 9 is 10 MΩ, only a voltage drop of 0.1 V is generated, so that almost no current flows through the diode 12 although the Zener diode 10 is eliminated. On the other hand, in a case where the leak current is 50 nA, a voltage of 0.5 V is generated across the resistor 9, and if there is only the diode 12, a current slightly flows through the diode 12.

When a circuit element having a Zener voltage of 2 V is used as the Zener diode 10, the diode 12 does not operate until the voltage across the resistor 9 becomes 2.6 V, which provides a great margin against 0.5 V. As described above, according to the first embodiment, even if a noise filter circuit with a relatively long operating time constant is used, it is provided to switch on and off the bias voltage in a period shorter than the operating time constant.

Figure 3:
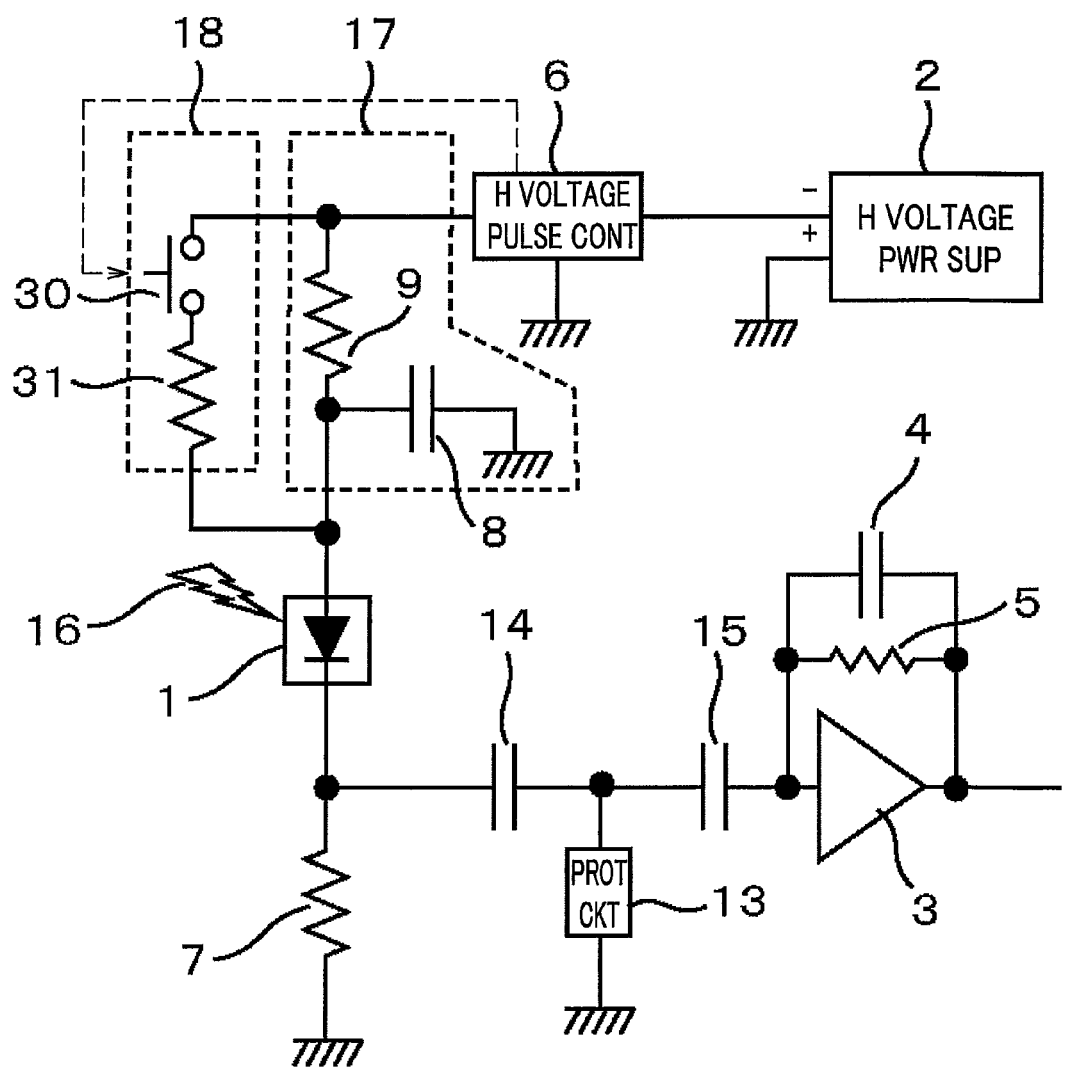
FIG. 3 is a schematic diagram of another circuit configuration of a radiation measuring apparatus according to the first embodiment.

In the example shown in FIG. 2, the diode 11, the diode 12, and the Zener diode 10 are used in the bias voltage transmitting circuit 18 to provide automatic switch in accordance with the voltage variation. However, another configuration is possible by, as shown in FIG. 3, using a switch 30 and a resistor 31 in the bias voltage transmitting circuit 18 and operating the switch 30 in response to an external command to control the bias voltage transmitting circuit 18 only when the bias voltage is switched on and off.

More specifically, the bias voltage transmitting circuit 18 is controlled to operate by switching on the switch 30 and when the bias voltage is switched on, the bias voltage transmitting circuit 18 is controlled not to be operated by switching off the switch 30.

In addition, the high voltage pulse controller 6 may control the switch 30 when the bias voltage is switched on and off.

Similarly to configuration of FIG. 1, the radiation measuring circuit comprising a noise removing circuit for removing noise from the bias voltage when the bias voltage is applied to the radiation detector comprising a semiconductor crystal and the bias voltage transmitting circuit connected in parallel for transmitting the output voltage of the bias power supply to the radiation detector when the bias voltage is switched off and on. Accordingly this configuration provides a preferable energy resolution and continuity for a preferable measurement because switch on and off of the bias voltage can be transmitted at a high speed without degradation of a noise removal performance.

In addition, a method of measuring radiation operates a noise removing circuit for removing noise from the bias voltage when the bias voltage is applied to the radiation detector comprising a semiconductor crystal and the bias voltage transmitting circuit for transmitting the output voltage of the bias power supply to the radiation detector when the bias voltage is switched off and on. This provides a preferable energy resolution and continuity for a preferable measurement because switch on and off of the bias voltage can be transmitted at a high speed without degradation of a noise removal performance.

Further, in the example shown in FIG. 2, the radiation measuring circuit, in which the noise removing circuit and the bias voltage transmitting circuit are switched without a command from the external, provides a high reliability because of no complicated operation.

Further, in the example shown in FIG. 3, the radiation measuring circuit, in which the noise removing circuit and the bias voltage transmitting circuit are switched in response to a command from the external, provides a high reliability because of no complicated circuit design.

Figure 4A:
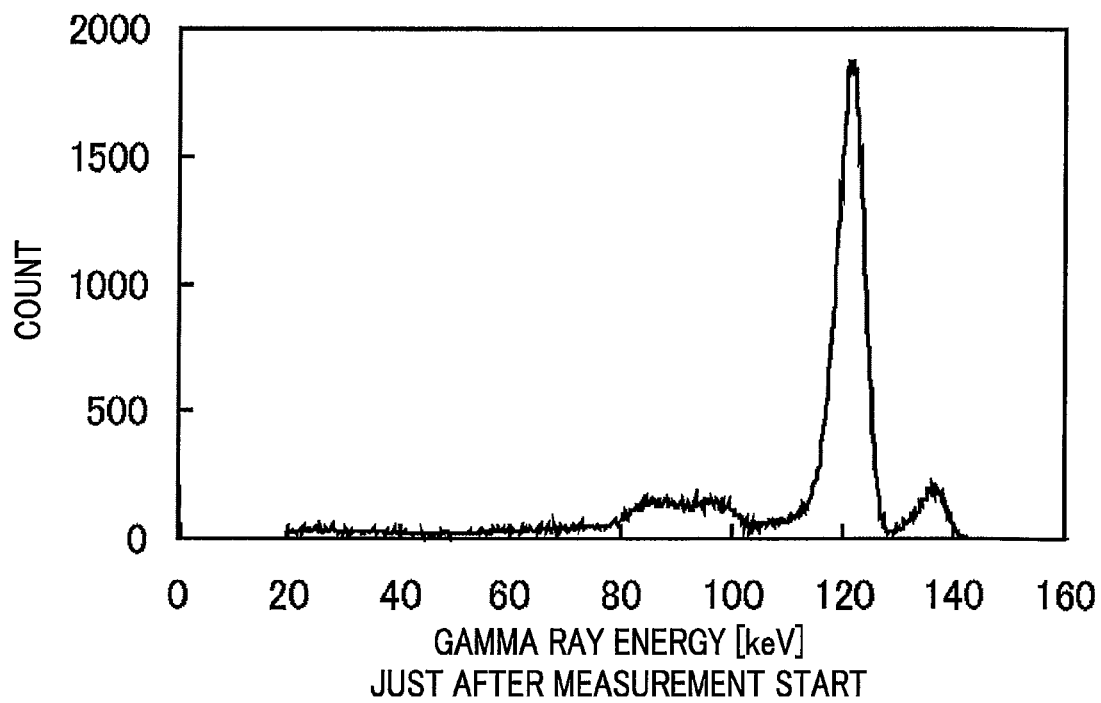
FIGS. 4A and 4B are charts schematically showing energy spectrums in the first embodiment.
Figure 4B:
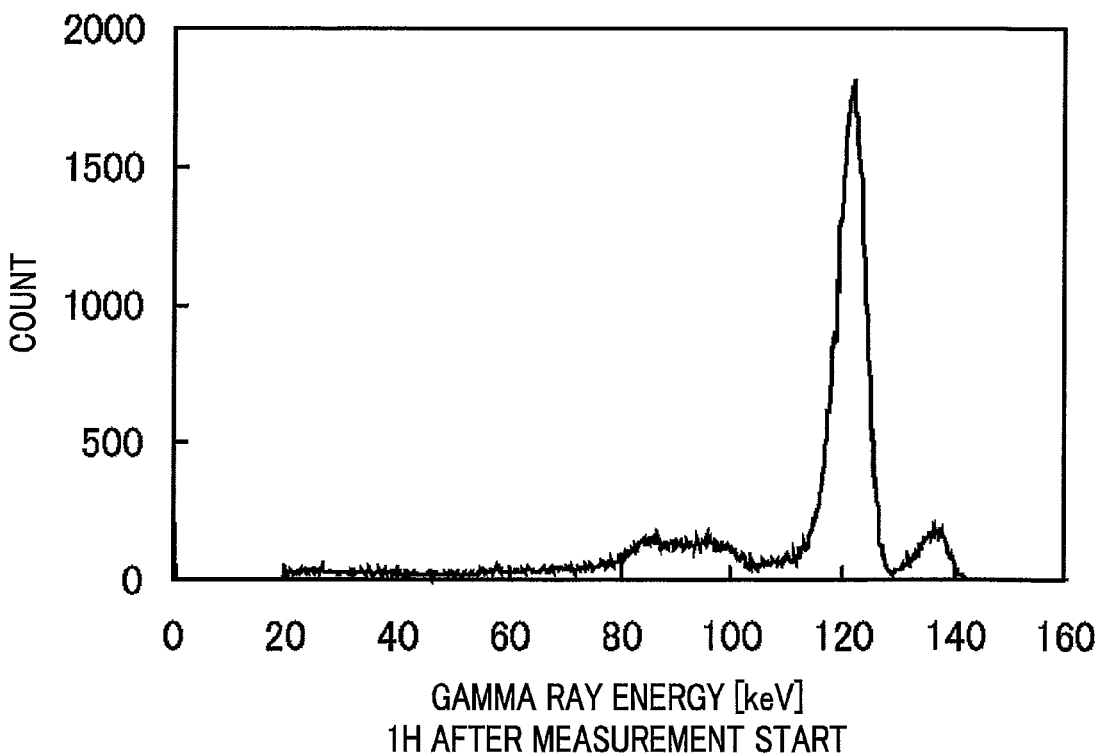

FIGS. 4A and 4B show results of energy spectrums of a gamma ray obtained with the radiation measuring apparatus according to the first embodiment. A detector having an electrostatic capacitance of 12 pF is used as the radiation detector and a temperature of the detector is maintained at 35° C. and 57Co is used as a radiation source.

When the bias voltage is switched off for 30 msec with a cycle period of 10 sec, the energy resolution with respect to a photo peak of 122 keV is 4.8% for five min just after switch on of the bias voltage (see FIG. 4A) and 4.8% when one hour on of the bias voltage after switch on of the bias voltage without change.

Figure 5:
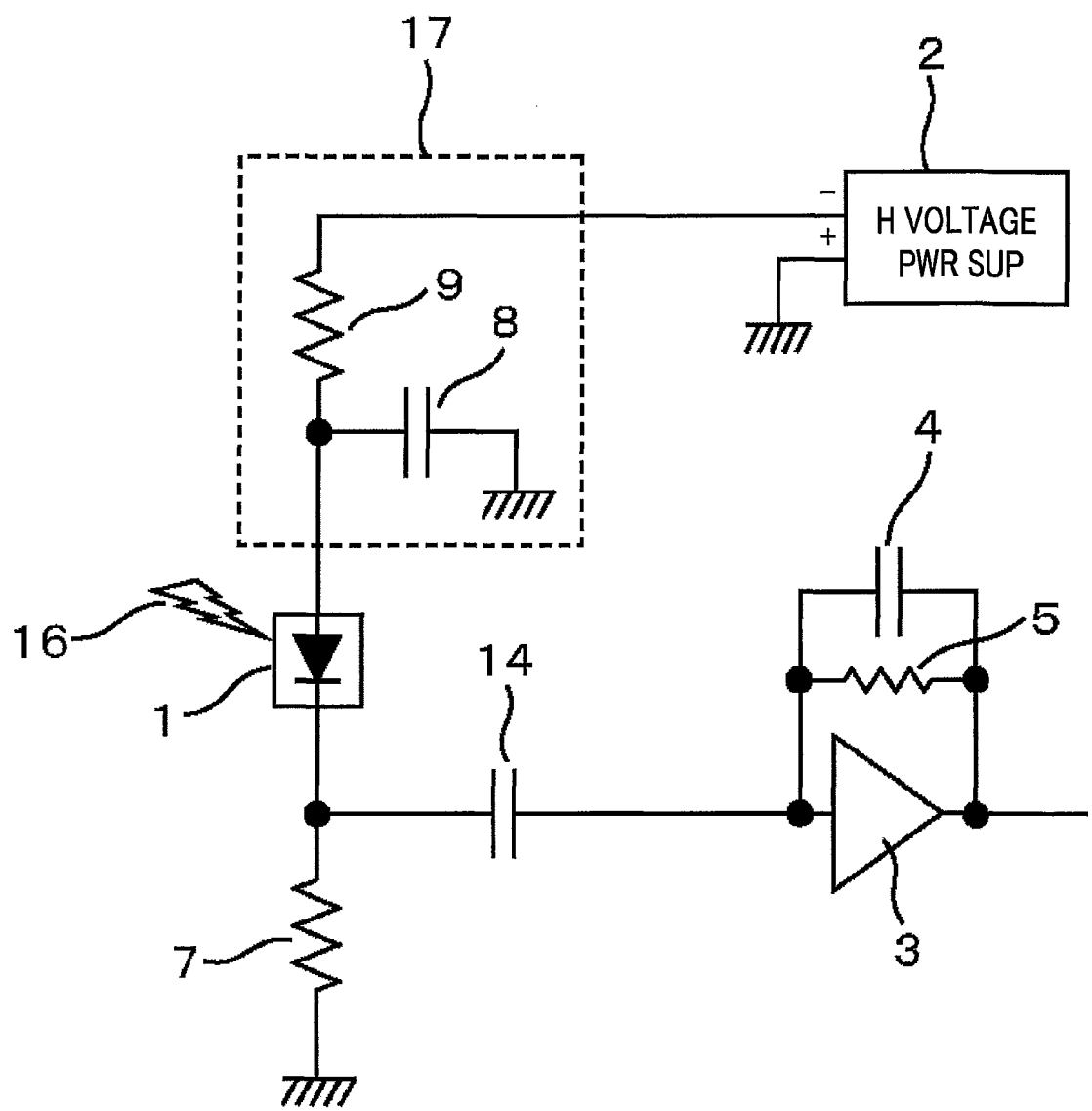
FIG. 5 is a schematic diagram of a circuit of a radiation measuring apparatus of a comparative example.
Figure 6A:
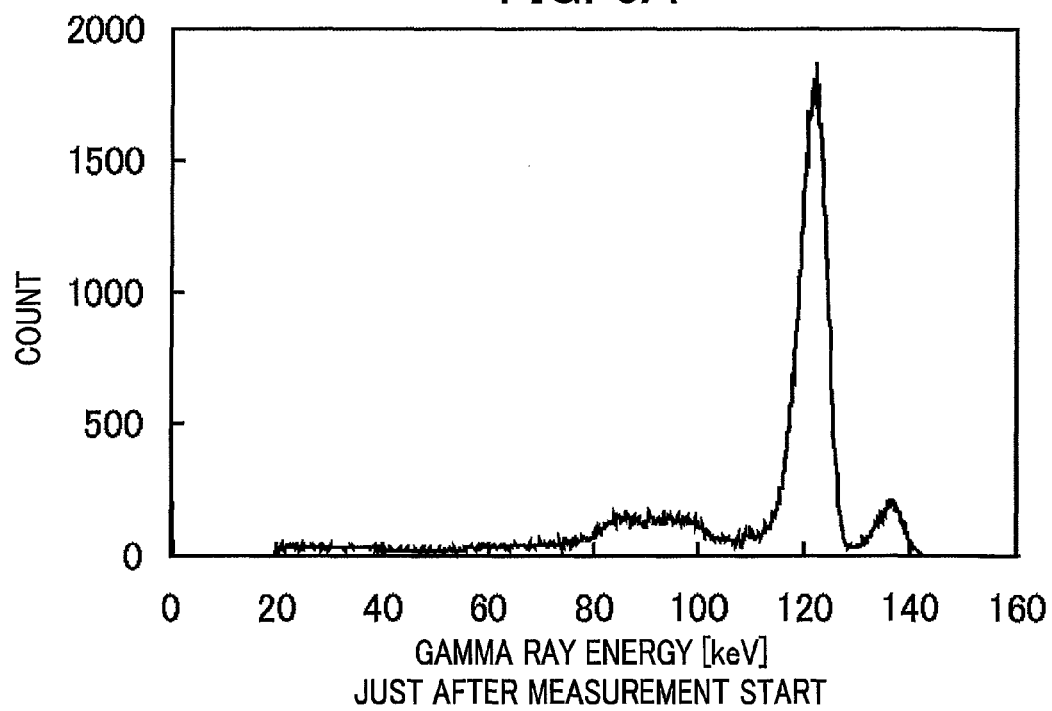
FIGS. 6A and 6B are charts schematically showing energy spectrums in the comparative example.
Figure 6B:
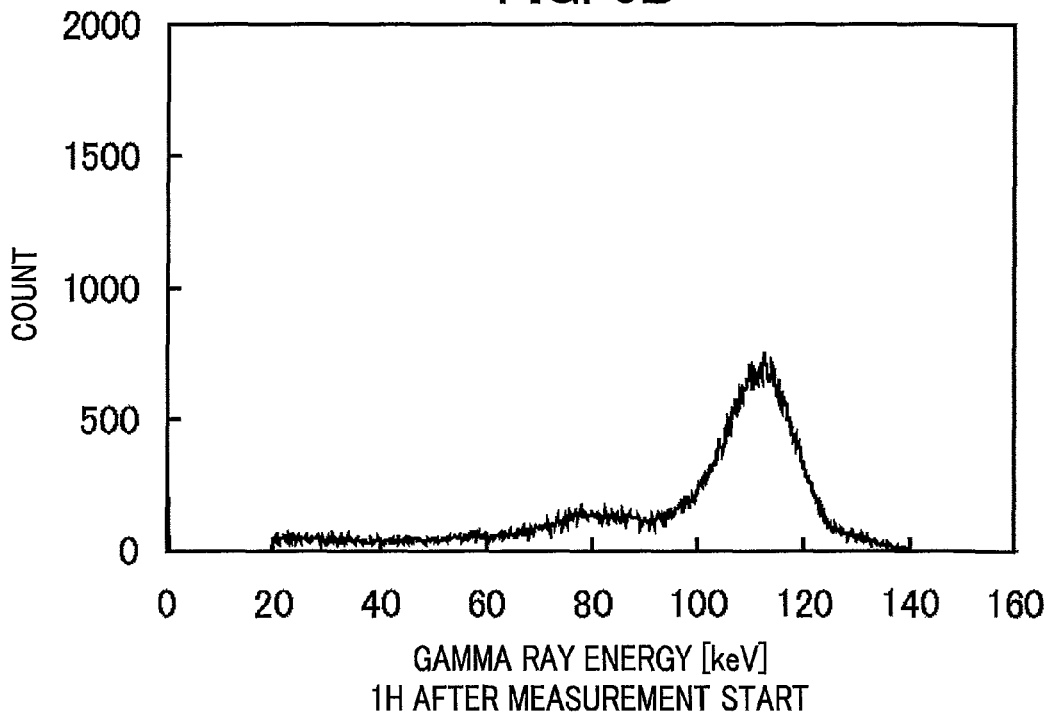

On the other hand, a similar measurement was done with a circuit of a comparative example shown in FIG. 5 in which switching on and off the bias voltage at a high speed is not considered. FIGS. 6A and 6B show observation results showing a phenomenon in which the energy resolution at a photo peak of 122 keV is 5.0% for five minutes just after switch on of the bias voltage (see FIG. 6A), on the other hand, the energy resolution after one hour from the switch on of the bias voltage is 14%, which become worse, and a peak to be originally seen at a position of 122 keV is shifted to a position around 110 keV. The degradation of performance when a certain time elapsed is caused by the "polarization".

Regarding counting rates reflecting the sensitivity, in the embodiment shown in FIG. 4A, the counting rate is 213 counts per second which is an integration value from 105 keV to 130 keV, on the other hand, in the comparative example, the counting rate is 214 counts per a second in FIG. 6A, and there is almost no difference.

According to the first embodiment, the radiation measuring apparatus can be obtained which is stable with time by suppressing the "polarization" without degradation of the performance of the energy resolution and the sensitivity.

In the first embodiment, the circuit using a clamp circuit and the Zener diode is concretely shown. However, the first embodiment does not have limitation in which only these elements are used to provide a desired circuit operation. The first embodiment intends to use the noise filter circuit and the bias voltage transmitting circuit at the same time and has no limitation in using other circuit elements.

Second Embodiment

Will be described a second embodiment.

Figure 7:
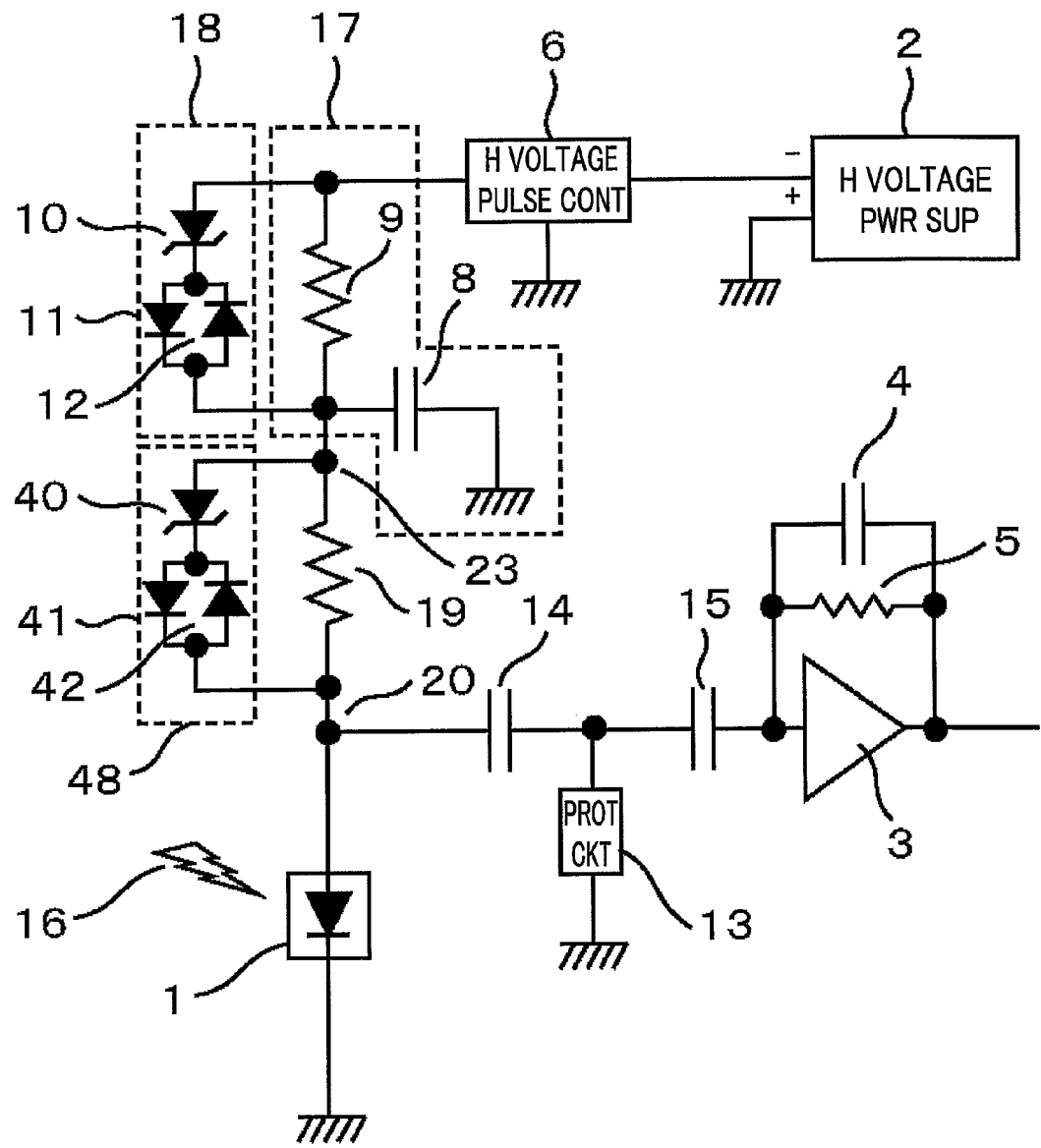
FIG. 7 is a schematic diagram of a circuit of a radiation measuring apparatus according to a second embodiment.

FIG. 7 shows a circuit of a radiation measuring apparatus according to the second embodiment showing from a radiation detector to a first stage of an amplifying circuit. A difference from the first embodiment is in that the detection signal is obtained from a bias voltage side of the detector 1. An advantageous effect on such a connection is in that connection between the detector 1 and a signal circuit can be simplified because it is sufficient to connect the detector 1 to only a junction point 20.

Hereinbelow will be described an operation of the radiation measuring apparatus.

A bias voltage of −500 V is applied to the detector 1 through the high voltage pulse controller 6, the noise filter circuit 17 comprising the resistor 9 and the capacitor 8, and a bias resistor 19.

A capacitor 14 is a coupling capacitor to prevent a high voltage bias voltage from being applied directly to the amplifying circuit 3 and also allow the detection signal generated by the detector 1 to flow to the amplifying circuit 3 in response to an incident gamma ray.

The detector 1 has a similar characteristic to a reverse characteristic of the diode in a state where the bias voltage is applied thereto. When the gamma ray 16 is incident to the detector 1 in this state, pairs of electrons and holes are generated which are proportional to the number of the incident photons and energy of the incident photons, so that a detection current of a quantity of charges flows. The detection current does not flow into the bias resistor having a high resistance, but into the capacitor 14 and reaches the amplifying circuit 3 via the capacitor 15. If the bias resistor 19 has a small resistance, a signal current also flows to a side of the noise filter circuit 17, decreasing in magnitude at the amplifying circuit 3.

Accordingly, it is necessary to make a resistance of the circuit element for the bias resistor 19 high. In addition, a protection circuit 13 is provided between the capacitor 14 and the capacitor 15. The protection circuit 13 is provided for protecting the amplifier circuit 3 from a surge voltage generated when the bias voltage is switched on and off for a short time interval.

Next, will be described a process in which the bias voltage is once switched off and then on again.

Similar to the first embodiment, consider a case where the bias voltage of −500 V is switched on to off or off to on in one msec. When a circuit element of 10 MΩ and a circuit element of 10000 pF are used as the resistor 9 and the capacitor 8, respectively which form the noise filter circuit 17, the filter circuit has a cutoff frequency of 1.6 MHz and an operating time constant of 100 msec. This cannot switch on and off the bias voltage in one msec.

On the other hand, when the diode 11, the diode 12, and the Zener diode 10 forming the circuit according to the present invention are used, even if the resistor of 10 MΩ and the capacitor 14 of 10000 pF are used, it is possible to transmit the switch on and off of the bias voltage in one msec similarly to the case of the first embodiment. However, in the case of FIG. 7, because there are the bias resistor 19 and the capacitor 14 as the coupling capacitor, it is necessary to consider time constants of these elements.

When a circuit element of 20 MΩ is used as the bias resistor 19 and a circuit element of 4700 pF is used as the capacitor 14, the time constant is 94 msec, so that it is impossible to vary the bias voltage in one msec. Accordingly, in FIG. 7, connecting a bias voltage transmitting circuit 48 similar to the bias voltage transmitting circuit 18 in parallel with the bias resistor 19 can vary the voltage on the detector 1 in one msec.

Next will be described operations of these circuits.

Circuit elements having an operation voltage of 0.6 V are used as the diodes 11 and 12 and a circuit element having a reverse operation voltage of 2 V and a forward operation voltage of 0.6 V is used as the Zener diode 10.

When the high voltage pulse controller 6 varies the bias voltage from −500 V to 0 V in one msec, the voltage across the resistor 9 rapidly increases. However, when the voltage across the resistor 9 exceeds 1.2 V, the diode 11 and the Zener diode 10 operate to allow charges in the capacitor 8 to flow, decreasing a voltage of the junction 23 to −1.2 V in response to the high voltage pulse controller 6. In addition, regarding the bias resistor 19, similarly the bias voltage transmitting circuit 48 operates to decrease the voltage of the detector to −2.4 V in about one msc in response to the high voltage pulse controller 6.

After that, when the high voltage pulse controller 6 varies the bias voltage from 0 V to −500 V in one msec, the voltage across the resistor 9 rapidly increases. However, when the voltage across the resistor 9 is equal to or greater than 2.6 V, the diode 12 and the Zener diode 10 operate to allow a current to flow into the capacitor 8, so that the voltage of the junction 23 reaches −497.4 V in about one msec. Regarding the bias resistor 19, similarly the bias voltage transmitting circuit 48 operates, the voltage of the detector reaching −494.8 V in about one msc in response to the high voltage pulse controller 6. After that, both the voltages across the resistor 9 and the bias resistor 19 become equal to or smaller than 2.6 V, so that the diode 12, the diode 42, the Zener diode 10, and the Zener diode 40 do not operate. The detector 1 sufficiently operates when the bias voltage reaches −494.8 V.

More specifically, similar to the first embodiment, the diode 11, the diode 12, and the Zener diode 10 operate only when the bias voltage is switched on and off and do not operate while the bias voltage is continuously on. The diode 41, the diode 42, and the Zener diode 40 also do not operate.

As described above, even if the noise filter circuit having a relatively long operation time constant is used, according to the present invention, it becomes possible to switch on and off the bias voltage in a shorter time interval than the operation time constant.

Further, in the examples mentioned above, regarding the bias voltage transmitting circuits 18 and 48, the same circuits as the circuit shown in FIG. 2 are used. However, the circuit shown in FIG. 3 and control can be employed.

As mentioned above, the bias voltage transmitting circuit comprises a bias resistor connected to the radiation detector on a side of the bias power supply and the bias voltage transmitting circuit connected in parallel to the bias resistor for transmitting the bias voltage to the radiation detector when the bias voltage is switched off and on. This makes connection between the radiation detector and the signal circuit simple and enables to switch on and off the bias voltage in a shorter time interval than the operation time constant.

Third Embodiment

Figure 8:
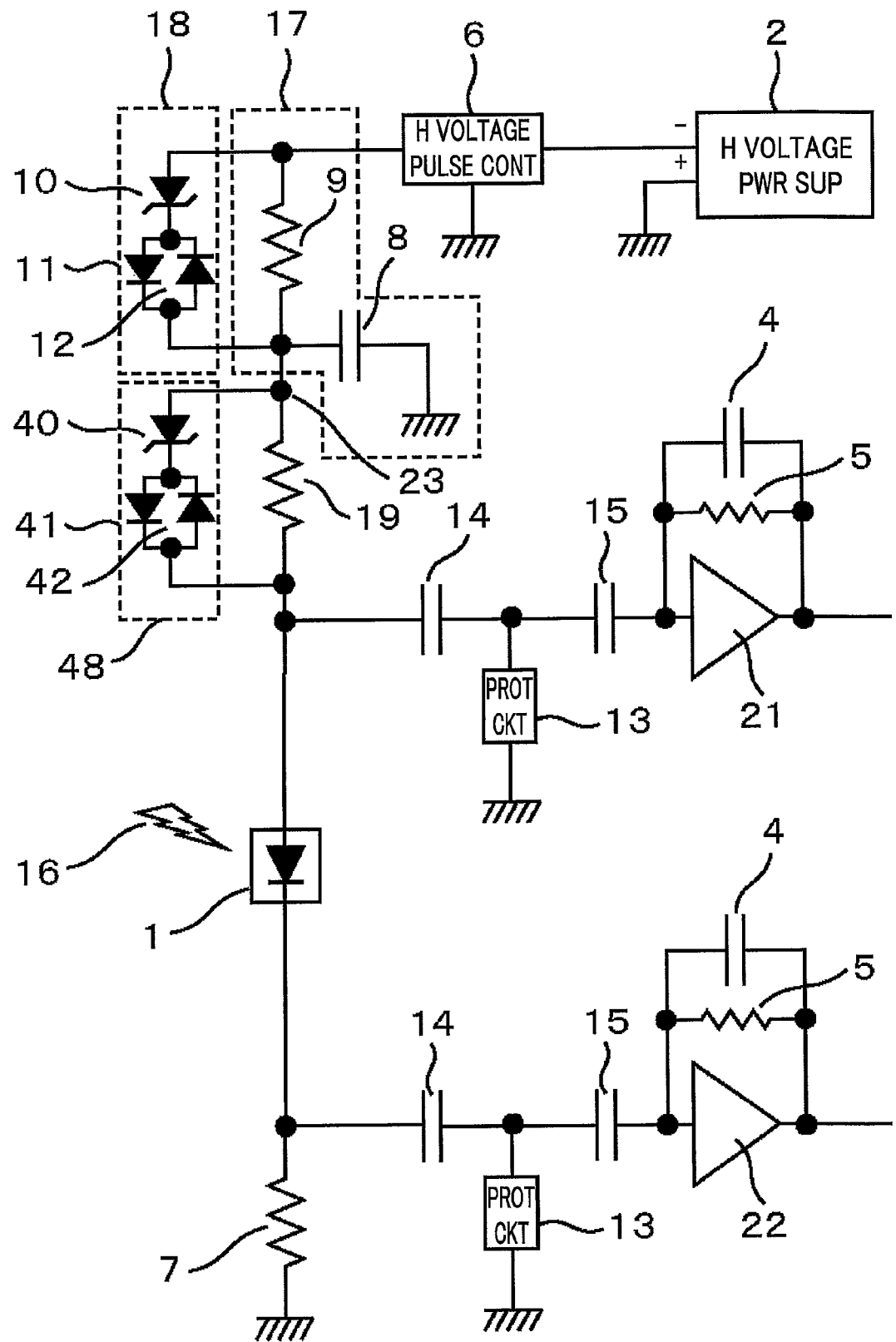
FIG. 8 is a schematic diagram of a circuit of a radiation measuring apparatus according to a third embodiment.

Will be described a third embodiment.
FIG. 8 shows a radiation measuring apparatus according to a third embodiment to show a circuit from the radiation detector to a first stage of amplifiers. A difference in the third embodiment from the first and second embodiments is in that detection signals are obtained from both the bias voltage side and the ground side of the detector 1.

An advantageous effect of this connection is in that symmetrical detection signals having opposite polarities can be obtained between the amplifiers 21 and 22. These detection signals are supplied to a differential amplifier at a following stage, which provides a circuit protected from noise coming from the external. There is an additional advantageous effect in that a more preferable energy resolution can be obtained with different wave-shaping time constants between the output signals of the amplifier 21 and the amplifier 22.

A circuit operation of the third embodiment is the same as those in the first and second embodiments, and thus a duplicated description will be omitted. Addition of the diode 11, the diode 12, the Zener diode 10, the diode 41, the diode 42, and the Zener diode as the circuit according to the third embodiment can almost eliminate a limitation in a speed of switch on and off of the bias voltage. As a result, it becomes possible to switch on and off the bias voltage for several msec in which the noise filter circuit having a time constant of about 100 msec is provided. In other words, without degradation of performance regarding noise, switch on and off of the bias voltage can be done at a high speed. This suppresses the "polarization" and dead time accompanying the switch on and off of the bias voltage.

In the above-described example, regarding the bias voltage transmitting circuits 18 and 48, the same circuits as the circuit shown in FIG. 2 are used. However, the circuit shown in FIG. 3 and control can be employed.

INDUSTRIAL APPLICABILITY

To obtain accurate energy information in measurement of radiation rays, particularly, measurement of the gamma ray, it is effective to use the semiconductor detector with a high energy resolution. The present invention is applicable to general radiation measuring apparatuses using the semiconductor detector in which the "polarization" may occur.

Figure 9:
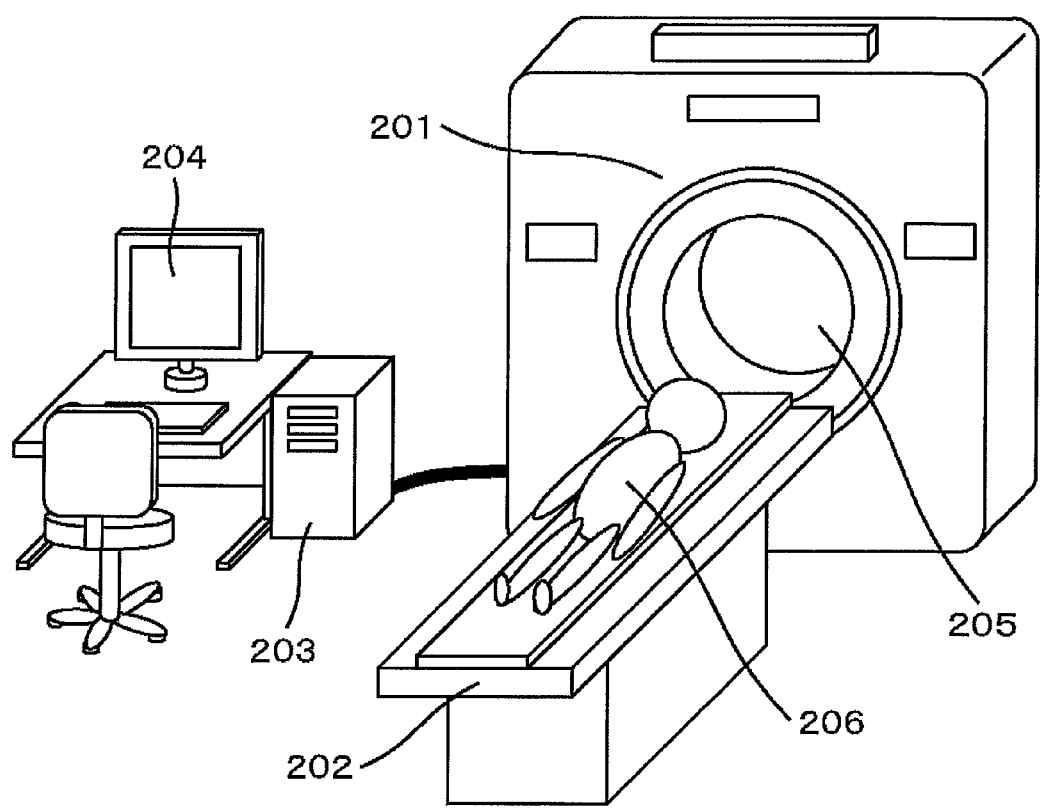
FIG. 9 is a perspective view of configuration of a PET apparatus having the radiation measuring apparatus according to the embodiments.

Similarly, the present invention is applicable to a nuclear medicine diagnosing apparatus. FIG. 9 shows a positron emission tomogram (PET apparatus) having the radiation measuring apparatus according to the first embodiment of the present invention.

The PET apparatus includes a PET apparatus body 201, a bed 202 for supporting and carrying a subject body, a data processing apparatus 203, and a display 204. The subject body 206 is put down on the bad 202 and carried within a measurement space 205, where radiation rays are measured by the PET apparatus. An exterior appearance is the same as that of the conventional PET. However, this PET apparatus has a superior energy resolution in the detector. Accordingly, the PET has a high removing performance of noise generated by scattering in transmission of the gamma ray emitted by a radiopharmaceutical through the subject body, providing a high quality image.

According to the present invention, the dead time is extremely shortened and a substantially continuous measurement is possible. Accordingly, there is almost no dead time for eliminating the polarization which was a weak point and there is almost no increase in noise, so that the energy resolution is high, a reliability is high due to no necessity of external switching circuit when the bias voltage is switched on and off.

Using a semiconductor detector is used in the nuclear medicine diagnosing apparatus such as the PET apparatus, the gamma camera apparatus, and a SPECT apparatus, it is possible to provide a high quality image can be obtained due to a superior energy discriminating power. However, conventionally, switching on and off the bias voltage at a high speed required to make the time constant of the noise filter circuit small. Further, if the time constant of the noise filter circuit is made great, it is impossible to switch on and off the bias voltage at a high speed, so that the dead time became long. The present invention can suppress decrease in energy resolution because of no noise increase in addition to that measurement can be done substantially continuously because the dead time can be extremely shortened. Accordingly a superior nuclear medicine diagnosing apparatus can be provided.

As mentioned above, the radiation measuring circuit comprises: a radiation detector 1 configured to generate a detection signal; a voltage power supply 2 configured to generate a bias voltage; a pulse controller 6 configured to control supplying (supplying and cutting off) the bias voltage to the radiation detector 1; a noise filter circuit 17 configured to filter the bias voltage from the pulse controller 6 to supply a filtered bias voltage to the radiation detector 1; and a bias voltage transmitting circuit 18, connected in parallel to the noise filter circuit 17, configured to transmit the bias voltage from the pulse controller 6.

The bias voltage transmitting circuit may include a circuit configuration so as to switch between the noise filter circuit 17 and the bias voltage transmitting circuit 18 automatically in supply of the bias voltage therethrough.

The bias voltage transmitting circuit 18 may include a switch 30 so as to switch between the noise filter circuit 17 and the bias voltage transmitting circuit 18 externally in supplying the bias voltage therethrough. The bias voltage transmitting circuit 18 may supply the bias voltage to the radiation detector 1 when the bias voltage from the pulse controller 6 rises and the noise filter circuit 17 supplies the bias voltage after the bias voltage from the pulse controller rises.

The nuclear medicine diagnosing apparatus comprises: the radiation measuring circuit and a radiation detector 1 configured to generate the detection signal; and the data processor 203 that generates diagnosis data from the detection signal.

A method of operating the radiation measuring circuit, comprises the steps of: operating the noise filter circuit 17 while the pulse controller 6 supplies the bias voltage to the radiation detector 1; and transiently operating the bias voltage transmitting circuit 18 when the pulse controller 6 stops supply of the bias voltage to the radiation detector 1.

The invention claimed is:

1. A radiation measuring circuit is characterized by a noise removing circuit that removes noise on a bias voltage when the bias voltage is applied from a bias power supply to a radiation detector comprising a semiconductor crystal and a bias voltage transmitting circuit that transmits an output voltage from the bias power supply when the bias voltage is switched off and on, the noise removing circuit and the bias voltage transmitting circuit being in parallel.

2. The radiation measuring circuit as claimed in claim 1, characterized in that the noise removing circuit and the bias voltage transmitting circuit are switched without an external command from external.

3. The radiation measuring circuit as claimed in claim 1, characterized in that the noise removing circuit and the bias voltage transmitting circuit are switched in response to an external command.

4. The radiation measuring circuit as claimed in claim 1, characterized by:
 a bias resistor connected to the radiation detector on a side of the bias power supply; and
 a bias voltage transmitting circuit connected in parallel to the bias resistor that transmits an output voltage from the bias power supply to the radiation detector when the bias voltage is switched off and on.

5. The radiation measuring circuit as claimed in claim 1, characterized in that the bias transmitting circuit is a clamp circuit connected in parallel to the a resistive element connected between the bias power supply and the radiation detector.

6. The radiation measuring circuit as claimed in claim 5, wherein the clamp circuit is configured by a combination of a diode and a Zener diode.

7. The radiation measuring circuit as claimed in claim 1, wherein the semiconductor crystal is cadmium telluride.

8. A nuclear medicine diagnosing apparatus comprising the radiation measuring circuit as claimed in claim 1.

9. A method of measuring radiation, comprising the steps of:
 operating a noise removing circuit configured to remove noise on a bias voltage when a bias voltage is applied from a bias power supply to a radiation detector comprising a semiconductor crystal; and
 operating a bias voltage transmitting circuit configured to transmit an output of the bias power supply to the radiation detector when the bias voltage is off and on.

10. A radiation measuring circuit comprising:
 a radiation detector configured to generate a detection signal;
 a voltage power supply configured to generate a bias voltage;
 a pulse controller configured to control supplying the bias voltage to the radiation detector;
 a noise filter configured to filter the bias voltage from the pulse controller to supply a filtered bias voltage to the radiation detector; and
 a bias voltage transmitting circuit, connected in parallel to the noise filter, configured to transmit the bias voltage from the pulse controller.

11. The radiation measuring circuit as claimed in claim 10, wherein the bias voltage transmitting circuit includes a circuit configuration so as to switch between the noise filter and the bias voltage transmitting circuit automatically in supply of the bias voltage therethrough.

12. The radiation measuring circuit as claimed in claim 10, wherein the bias voltage transmitting circuit includes a switch so as to switch between the noise filter and the bias voltage transmitting circuit externally in supplying the bias voltage therethrough.

13. The radiation measuring circuit as claimed in claim 10, wherein the bias voltage transmitting circuit supplies the bias voltage to the radiation detector when the bias voltage from the pulse controller rises and the noise filter supplies the bias voltage after the bias voltage noise from the pulse controller rises.

14. A nuclear medicine diagnosing apparatus comprising: the radiation measuring circuit as claimed in claim 10;
 a radiation detector configured to generate a detection signal; and
 a data processor configured to generate diagnosis data from the detection signal.

15. A method of operating the radiation measuring circuit as claimed in claim 10, comprising the steps of:
 operating the noise filter while the pulse controller supplies the bias voltage to the detector; and
 operating the bias voltage transmitting circuit when the pulse controller stops supply of the bias voltage to the detector.

* * * * *